United States Patent [19]

Kud et al.

[11] Patent Number: 5,142,020
[45] Date of Patent: Aug. 25, 1992

[54] POLYESTERS CONTAINING NONIONIC SURFACTANTS AS COCONDENSED UNITS, PREPARATION THEREOF AND USE THEREOF IN DETERGENTS

[75] Inventors: Alexander Kud, Eppelsheim; Dieter Boeckh; Wolfgang Trieselt, both of Ludwigshafen; Hans-Ulrich Jaeger, Neustadt; Heinrich Hartmann, Limburgerhof, all of Fed. Rep. of Germany

[73] Assignee: Basf Aktiengesellschaft, Ludwigshafen, Fed. Rep. of Germany

[21] Appl. No.: 642,870

[22] Filed: Jan. 18, 1991

[30] Foreign Application Priority Data

Jan. 19, 1990 [DE] Fed. Rep. of Germany ....... 4001415

[51] Int. Cl.⁵ ............................................. C08G 63/20
[52] U.S. Cl. .................................. 528/272; 528/296; 528/297; 528/300; 528/302; 528/303; 528/306; 528/308; 528/308.6; 525/437; 525/438; 252/8.9; 252/89.1; 252/174.22
[58] Field of Search ............... 528/272, 297, 300, 302, 528/306, 308, 308.6, 296, 303; 525/437, 438; 252/8.9, 174.22, 89.1, D1, D14

[56] References Cited

U.S. PATENT DOCUMENTS 3,083,187 3/1963 Stuart et al. ........................ 528/301
3,557,039 1/1971 McIntyre et al. ................... 524/605

FOREIGN PATENT DOCUMENTS

| | | |
|---|---|---|
| 100093 | 2/1984 | European Pat. Off. . |
| 0185427 | 6/1986 | European Pat. Off. . |
| 0241984 | 10/1987 | European Pat. Off. . |
| 0241985 | 10/1987 | European Pat. Off. . |
| 0272033 | 6/1988 | European Pat. Off. . |
| 2192167 | 2/1974 | France . |
| 999062 | 7/1965 | United Kingdom . |
| 1154730 | 6/1969 | United Kingdom . |

OTHER PUBLICATIONS

Chemical Abstracts, Band 85, Nr. 6, Aug. 9, 1976, Seite 51, Zusammenfassung Nr. 3409a, Columbus, Ohio, US; & JP-A-76 37 993 (Teijin, Ltd) Mar. 30, 1976 *Insgesamt*.

Primary Examiner—Samuel A. Acquah
Attorney, Agent, or Firm—Oblon, Spivak, McClelland, Maier & Neustadt

[57] ABSTRACT

Polyesters obtainable by condensation of
(a) an at least dicarboxylic acid, or an ester or anhydride or a mixture thereof,
(b) an at least dihydric alcohol or an addition product of from 1 to 5 mol of at least one alkylene oxide of 2 or 3 carbon atoms with 1 mol of an at least dihydric alcohol, or a mixture thereof, and
(c) a water-soluble addition product of from 5 to 80 mol of at least one alkylene oxide with 1 mol of a $C_8$-$C_{24}$-alcohol, a $C_8$-$C_{18}$-alkylphenol or a $C_8$-$C_{24}$-alkylamine in a molar ratio of (a):(b):(c) of 100:(25–2500):(5–110) at not less than 120° C. up to a weight average molecular weight of from 2000 to 50000, are used in amounts of from 0.05 to 15% by weight as grayness inhibitors and soil release promoters in detergents.

24 Claims, No Drawings

POLYESTERS CONTAINING NONIONIC SURFACTANTS AS COCONDENSED UNITS, PREPARATION THEREOF AND USE THEREOF IN DETERGENTS

U.S. Pat. No. 3,557,039 discloses stable aqueous dispersions of polymers preparable by condensation of terephthalic acid or dimethyl terephthalate with ethylene glycol and polyethylene glycol of an average molecular weight of from 1000 to 4000. The molar ratio of ethylene terephthalate to polyethylene glycol terephthalate units is from 2:1 to 6:1. The dispersions are used for treating the surfaces of polyester articles.

GB Patent 1,154,730 discloses in relation to the washing of textile material that the redeposition of soil on the textile material can be reduced by adding to the wash liquor, which contains a detergent, polycondensates which contain either ester or amide repeat units. These additives are for example condensation products as described in U.S. Pat. No. 3,557,039 which are obtainable by condensation of dimethyl terephthalate, ethylene glycol and a polyethylene glycol of molecular weight 1500.

EP Applications 185,427, 241,984, 241,985 and 272,033 disclose polyester condensates of polybasic aromatic carboxylic acids with dihydric alcohols and one-sidedly $C_1$-$C_4$-masked polyethers, which promote soil detachment from polyester fabrics These polyesters have hydrophilic end groups which the applications mentioned refer to as prerequisites for the soil-detaching properties of the polyesters.

Most of the above-described polyesters do not give clear solutions in water and in many liquid detergent formulations, only dispersions. If such polyesters are used in detergent formulations, an increased graying is frequently observed in the presence of mineral oil/pigment soil cloths In addition, incompatibility or formulation problems with other detergent ingredients are frequently encountered, resulting for example in the separation of liquid detergent formulations which contain ie. fluorescent whitening agent, in a loss of effectiveness due to hydrolysis and the release of non-detergent hydrolysis products, or in phase separations of concentrated liquid detergents having a low water content.

It is an object of the present invention to provide polyesters which, compared with the prior art polyesters, show improved effectiveness and better compatibility in liquid and pulverulent detergent formulations.

We have found that this object is achieved according to the present invention by a polyester formed from a carboxylic acid which contains at least two carboxyl groups and an at least dihydric alcohol, obtainable by condensation of (a) an at least dicarboxylic acid, or an ester or anhydride or a mixture thereof, (b) an at least dihydric alcohol or an addition product of from 1 to 5 mol of at least one alkylene oxide of 2 or 3 carbon atoms with 1 mol of an at least dihydric alcohol, or a mixture thereof, and (c) a water-soluble addition product of from 5 to 80 mol of at least one alkylene oxide with 1 mol of a $C_8$-$C_{24}$-alcohol, a $C_6$-$C_{18}$-alkylphenol or a $C_8$-$C_{24}$-alkylamine.

in a molar ratio of (a):(b):(c) of 100:(25-2500):(5-110) at not less than 120° C. up to a weight average molecular weight of from 2000 to 50000, superstoichiometric amounts of component (b) being substantially removed by distillation. The polyesters thus obtainable are used as grayness-inhibiting and soil-detaching additives in pulverulent and liquid detergent formulations in amounts of from 0.05 to 15 % by weight, based on the detergent formulation.

Suitable components (a) for preparing the polyesters are for example terephthalic acid, o- and m-phthalic acid, sulfoisophthalic acid, trimellitic acid, pyromellitic acid and the mono- and dialkyl esters with $C_1$-$C_8$-alcohols, such as dimethyl terephthalate, diethyl terephthalate and di-n-propyl terephthalate. Further examples of compounds which can be used as component (a) for preparing the polyesters are oxalic acid, succinic acid, glutaric acid, adipic acid, fumaric acid, maleic acid, itaconic acid and the mono- and dialkyl esters of said carboxylic acids with $C_1$-$C_6$-alcohols, eg. diethyl oxalate, diethyl succinate, diethyl esters, diethyl glutarate, monomethyl adipate, diethyl adipate, di-n-butyl adipate, monoethyl fumarate and dimethyl maleate. If a suitable dicarboxylic acid can form an anhydride, it is also possible to use the anhydride of an at least dicarboxylic acid as component (a) for preparing the polyester, eg. maleic anhydride, phthalic anhydride or succinic anhydride. Particular preference for use as component (a) is given to terephthalic acid, phthalic acid and the dimethyl, diethyl, dipropyl and dibutyl esters of terephthalic acid, o-phthalic acid and m-phthalic acid. It is of course possible to use mixtures of different carboxylic acids or esters. Similarly, it is also possible in the condensation to use for example mixtures of carboxylic acids and esters or mixtures of carboxylic acids and anhydrides.

A suitable component (b) for preparing the polyester is an at least dihydric alcohol or an addition product of from 1 to 5 mol of one or more alkylene oxides of 2 or 3 carbon atoms with 1 mol of an at least dihydric alcohol. Suitable compounds of this group are for example ethylene glycol, 1,2-propylene glycol, 1,3-propylene glycol, 1,4-butanediol, 2,3-butanediol, pentanediols, glycerol, pentaerythritol, oligoglycerol up to molecular weight 363 and the addition products of from 1 to 5 mol of ethylene oxide and/or propylene oxide with 1 mol of the abovementioned at least dihydric alcohols, eg. ethylene diglycol, propylene diglycol, addition products of from 1 to 4 mol of ethylene oxide with pentaerythritol, addition products of from 1 to 3 mol of ethylene oxide with 1 mol of glycerol, addition products of from 1 to 3 mol of propylene oxide with 1 mol of glycerol and addition products of from 1 to 5 mol of ethylene oxide and/or propylene oxide with one mole on this occasion of oligoglycerol containing from 2 to 5 cocondensed glycerol units.

Preferred components (b) are glycerol and the addition products of from 1 to 5 mol of ethylene oxide with one mole of glycerol.

Suitable components (c) for preparing the polyester are water-soluble addition products of from 5 to 80 mol of one or more alkylene oxides with 1 mol of $C_8$-$C_{24}$-alcohol, $C_6$-$C_{18}$-alkylphenol or $C_8$-$C_{24}$-alkylamine. The alkylene oxide used for preparing the compounds of component (c) is preferably ethylene oxide or a mixture of ethylene oxide and propylene oxide. It is also possible to use mixtures of ethylene oxide with propylene oxide and/or butylene oxide, mixtures of ethylene oxide, propylene oxide and isobutylene oxide and mixtures of ethylene oxide and one or more butylene oxides. These water-soluble alkylene oxide addition products are surfactants If prepared using mixtures of alkylene oxides, they may contain the alkylene oxides in blocks or else in random distribution.

Suitable alcohols for alkoxylation are for example octyl alcohol, decyl alcohol, lauryl alcohol, myristyl alcohol, stearyl alcohol and the alcohols of from 8 to 24 carbon atoms obtainable by the Ziegler process or the corresponding oxo process alcohols. Of the alkylphenols, it is in particular octylphenol, nonylphenol and dodecylphenol which are important for preparing the surfactants in question. Of the likely alkylamines, it is in particular the $C_{12}$–$C_{18}$-monoalkylamines which are used for preparing the water-soluble surfactants.

Suitable components (d) are alkoxylated polyhydric alcohols obtainable by addition of from more than 5 to 80 mol of ethylene oxide and/or propylene oxide to polyhydric alcohols. Suitable polyhydric alcohols are for example ethylene glycol, propylene glycol, butylene glycols, pentanediols, hexanediols, glycerol, pentaerythritol, trimethylolpropane and oligoglycerols containing from 2 to 5 cocondensed glycerol units.

Preferably, from 10 to 40 mol of ethylene oxide or a mixture of ethylene oxide and propylene oxide are added to 1 mol of a polyhydric alcohol. The compounds of component (d) are merely used to modify the polyesters according to the present invention.

The polyesters according to the present invention are obtainable by condensing components (a) to (c) with or without (d) at not less than 120° C. Preferably, the condensation is carried out within the range from 150° to 300° C. in the presence of the customary polycondensation and transesterification catalysts. It is customarily carried out by melting components (a) to (d) together with the catalysts and any further additives, for example antioxidants, in a kettle under an inert gas and distilling off the water formed and/or the alcohol liberated in the course of the transesterification. The ratio of components (a) to (c) with or without (d) used in the reaction is advantageously chosen in such a way that the number of OH groups corresponds to that of the carboxylic acid groups. This produces polycondensates having a very high molecular weight. However, the condensation may also be started with an excess of component (b) which is distilled off in the course of the condensation. It may similarly be of advantage, however, to add one of components (a) or (c) and, if desired, (d) in full or in part to the reaction mixture at a later stage of condensation. The preparation of the polyesters according to the present invention is similar to the prior art preparation of customary polyesters Such processes are known, for example, from previously cited U.S. Pat. No. 3,557,039.

If the polyester is prepared using as component (a) a dicarboxylic diester, it is advantageous in the condensation first to raise the temperature gradually from about 150° to 200°–220° C. in order that the volatile dialkyl dicarboxylate may be converted into a nonvolatile precondensate The condensation is then preferably continued at from 200° to 280° C. until the polyester has the desired molecular weight. During this part of the process the volatile by-products are removed by reducing the pressure or passing an inert gas such as nitrogen through the polyester melt.

In a particular embodiment of the preparation of the polyester according to the present invention, components (a) and (c) are first precondensed and the resulting volatiles are removed from the reaction mixture and thereafter component (b) and, if desired, component (d) is or are added in the course of the reaction. The products thus obtainable are less colored than those obtainable by direct condensation of components (a) to (d) by a one-pot process. A further advantage of the precondensation of components (a) and (c) for preparing the polyester is that a shorter reaction time is required compared with the simultaneous condensation of components (a) to (d).

A suitable catalyst is any compound described for this purpose in the literature. If component (a) is a free polycarboxylic acid or an anhydride, then p-toluenesulfonic acid is the preferred catalyst. If component (a) is a dialkyl carboxylate or a polycarboxylic ester, the customary transesterification catalysts are used, eg. zinc acetate, mixtures of calcium acetate and antimony oxide or tetraalkoxytitanates, such as titanium tetraisobutoxide or titanium tetraisopropoxide. Other preferred catalysts are for example carbonates, acetates and/or $C_1$–$C_4$-alkoxylates of lithium, sodium, magnesium, cobalt, manganese, vanadium, titanium and tin and also tin oxides. The catalyst is in general used in an amount of from 20 to 5000, preferably from 50 to 2000, ppm, based on components (a) to (d) used in the condensation.

The condensation can be carried out in the presence of antioxidants, for example substituted phenols, eg. 2,5-di-tert-butylphenol, 2-methylcyclohexyl-4,6-dimethylphenol, 2,6-di-tert-butyl-4-methylphenol, pyrogallol, phosphorous acid or other antioxidants customarily used for this purpose. These compounds prevent discoloration of the polyester due to oxidation during the condensation.

The proportions used per 100 mol parts of compounds (a) are from 25 to 2500, preferably from 35 to 400, mol parts of compounds of component (b) and from 5 to 110, preferably from 10 to 100, mol parts of compounds of component (c). The compounds of component (d) are merely used to modify the polyester formed from components (a) to (c). Per 100 mol parts of compounds of component (a) the amount used of compounds of component (d) is from 0 to 20, preferably from 0 to 10, mol parts.

Preferably, polyesters are prepared by condensation of
(a) terephthalic acid or $C_1$–$C_6$-dialkyl esters of terephthalic acid,
(b) glycerol and
(c) water-soluble addition products of from 5 to 80 mol of one or more alkylene oxides with 1 mol of a $C_8$–$C_{24}$-alcohol. The condensation is continued until polyesters having a weight average molecular weight of from 3000 to 35000 have formed.

Particular preference is given to polyesters which contain
(a) 40–50 mol % of terephthalic acid,
(b) 17–23 mol % of glycerol and
(c) 30–35 mol % of an ethoxylated linear $C_8$–$C_{20}$-alcohol with a degree of ethoxylation of 10 to 60
as cocondensed units and have a weight average molecular weight of from 4000 to 25000. If the polyesters prepared according to the present invention are not sufficiently soluble in water, the solubility in water can be augmented by using solubilizers. Such compounds are for example alcohols, such as ethanol, propanol, isopropanol, ethylene glycol, propylene glycol and also oligomeric ethylene glycols or oligomeric propylene glycols which each contain from 2 to 20 alkylene glycol units. Other suitable solubilizers are anionic surfactants, such as alkyl sulfates, alkylbenzenesulfonates and soaps, and also nonionic surfactants, for example ethoxylated fatty alcohols. Particular preference is given to the use of lauryl sulfate as solubilizer. Solubilizers are used in amounts of from 0.05 to 20 % by weight, based on polyester.

The polyesters according to the present invention are used as additives in pulverulent or liquid detergent formulations in amounts of from 0.05 to 15 % by weight, based on the detergent formulation. In the detergent liquor they act as grayness inhibitors and soil release promoters. The polyesters according to the present invention are of particular interest for use in phosphate-free and reduced-phosphate washing powders, in liquid detergents and in laundry aftertreatment agents, for example fabric softeners. The reduced-phosphate detergent formulations contain less than 25 % by weight of phosphate.

Detergent formulations vary widely in composition, but they all contain surfactants and possibly builders. It is therefore of course impossible to specify detailed compositions of general validity for detergent formulations. Detergent formulations contain as surfactants for example anionic surfactants, such as $C_8$–$C_{12}$-alkylbenzenesulfonates, $C_{12}$–$C_{16}$-alkanesulfonates, $C_{12}$–$C_{16}$-alkylsulfates, $C_{12}$–$C_{16}$-alkyl sulfosuccinates and sulfated ethoxylated $C_{12}$–$C_{16}$-alkanols. In addition to anionic surfaCtants it is also possible to use nonionic surfactants, for example $C_8$–$C_{12}$-alkylphenol ethoxylates, $C_{12}$–$C_{20}$-alkane alkoxylates and also block copolymers of ethylene oxide and propylene oxide. The end groups of the polyalkylene oxides may be masked, meaning that the free OH groups of the polyalkylene oxides may be etherified, esterified, acetylated and/or aminated.

Nonionic surfactants also include $C_8$–$C_{18}$-alkyl glucosides and also the alkoxylated products obtainable therefrom, particularly those which are preparable by reacting alkyl glucosides with ethylene oxide, and also the fatty acid esters and fatty acid amides of hydroxy-or amino-carboxylic acids or -sulfonic acids, for example fatty acid sarcosides, glycolates, lactates, taurides or isethionates. The anionic surfactants can be present in the form of sodium, potassium and ammonium salts and also as soluble salts of organic bases, such as mono-, di- or triethanolamine or other substituted amines. The surfactants used in detergent formulations may also be zwitterionic in character and be soaps. Surfactants are in general present in detergent formulations in an amount of from 2 to 50, preferably 5 to 45, % by weight.

Suitable builders for inclusion in detergent formulations are for example phosphates (eg. orthophosphate, pyrophosphate or in particular pentasodium triphosphate), zeolites, sodium carbonate, polycarboxylic acids, nitrilotriacetic acid, citric acid, tartaric acid, the salts of said acids and also monomeric, oligomeric or polymeric phosphonates. The individual substances are used in different amounts for preparing detergent formulations, for example sodium carbonate in amounts of up to 80 % by weight, phosphates in amounts of up to 45 % by weight, zeolites in amounts of up to 40 % by weight, nitrilotriacetic acid and phosphonates in amounts of up to 10 % by weight and polycarboxylic acids in amounts of up to 20 % by weight, each percentage being based on the detergent formulation as a whole. Since the realization that the use of phosphates in detergents presents a serious threat to the environment, the phosphate content of detergents has been increasingly reduced, so that detergents these days contain at most 25 % of phosphate or preferably are phosphate-free.

Further possible constituents of detergent formulations are corrosion inhibitors, such as silicates. Suitable silicates are for example sodium silicate, sodium disilicate and sodium metasilicate. Corrosion inhibitors can be present in detergent formulations in amounts of up to 25 % by weight. Further customary additives included in detergent formulations are bleaching agents, which may be present therein in an amount of up to 30 % by weight. Suitable bleaching agents are for example perborates or chlorine-releasing compounds, such as chloroisocyanurates. Further customary additives for optional inclusion in detergent formulations are fluorescent whitening agents, enzymes and scents. Washing powders may also contain up to 50 % by weight of a standardizing agent, such as sodium sulfate. Detergent formulations can be water-free or contain only small amounts of water, for example up to 10 % by weight. Liquid detergents can contain up to 80 % by weight of water. Customary detergent formulations are described in detail in German Laid-Open Application DOS 3,514,364, to which reference is made for further characterization of detergent formulations.

The above-described polyesters can be used in all liquid and pulverulent detergent mixtures. They are preferably present in amounts of from 0.2 to 10 % by weight. A particular advantage of the polyesters according to the present invention is their good compatibility with most liquid detergent formulations. In general, the polyesters according to the present invention form clear solutions therein. Should any compatibility problems with liquid detergent formulations arise nonetheless, it is possible to employ the above-described solubilizers, in particular ethylene glycol, propylene glycol or their respective oligomers, isopropanol or other alcohols, in amounts of from 0.1 to 20 % by weight, based on the mixture. As we have found, in particular the addition of from 0.1 to 20 % by weight, based on the liquid detergent formulation, of lauryl sulfate leads to a distinct improvement in the compatibility of the polyesters in the liquid detergent Owing to the high compatibility in liquid detergent formulations, the polyesters according to the present invention can even be used in low-water or even water-free liquid detergent formulations.

The polyesters according to the present invention can also be incorporated into a detergent formulation together with known grayness inhibitors or soil release promoting polymers; for example, depending on the detergent composition, the formulation may include combinations with graft copolymers formed from polyalkylene oxides and vinyl esters or acrylic esters, with modified cellulose derivatives such as hydroxypropylmethylcellulose, methylcellulose or carboxymethylcellulose, with polyalkylene oxides, eg. polyethylene oxide, polypropylene oxide or block copolymers of ethylene oxide and propylene oxide, or with polycarboxylates such as polyacrylic acids or acrylic acid/maleic acid copolymers, in which case a synergistic interreaction between the ingredients may produce a greater effect than obtained from using the components alone.

If the polyesters according to the present invention are used in liquid detergents, it can be particularly advantageous to use them in combination with polymers for liquid detergents, in particular polycarboxylates, which have been modified by the introduction of surfactants into the polymers.

A further advantage of polyesters according to the present invention is their high level of effectiveness which pertains over a wide molecular weight range of the polyesters If polyesters are used it is virtually impossible, in particular in liquid detergent formulations, to prevent a certain, albeit gradual, degradation of the molecular weight owing to the alkaline medium. In particular prior art low molecular weight unbranched polyesters rapidly become ineffective. By contrast, the branched high molecular weight polyesters according to the present invention show distinctly improved effectiveness. In addition, any partial hydrolysis of the polyesters which does occur releases in the main detergent-active, biodegradable surfactants which may aid the detersive effect.

A further advantage of the polyesters according to the present invention over the polyesters described for example in U.S. Pat. No. 3,557,039 is their excellent effectiveness in relation to mineral oil and pigment stains.

A preferred way of using the polyesters according to the present invention is in the form of powders or granules obtainable by spray drying or fluidized bed drying of the polyesters together with other solid detergent ingredients, such as polycarboxylates or zeolites. This form of makeup for the polyesters according to the present invention increases the stability of the polyesters in pulverulent detergents since the polyesters are protected from the strongly alkaline constituents of the detergent formulation.

The reported molecular weights are weight averages. They have been determined by gel permeation chromatography (solvent:tetrahydrofuran; column material:Pl-gel (from: Polymer Laboratories, GB), the elution rate being 0.8 ml/min at 35° C. The standard used was narrow-peaked polystyrene The detector used was a UV detector at 254 nm). The OH number and the acid number were determined by standard methods, as described for example by E. Müller, Houben-Weyl, Methoden der organischen Chemie, Georg Thieme Verlag, Stuttgart 1963, Volume 14/2, p. 17/18.

EXAMPLES

A. Preparation of polyesters

Example 1

A 2-1 capacity three-neck flask equipped with a stirrer, an add vessel, a distillation bridge and a gas inlet means was charged with 116.3 g of terephthalic acid, 700 g of the addition product of 25 mol of ethylene oxide with 1 mol of a mixture of linear $C_{16}/C_{18}$-fatty alcohols, 0844 g of p-toluenesulfonic acid monohydrate and 1 688 g of 50 % strength aqueous phosphorous acid, and the contents were stirred and carefully purged with nitrogen. The mixture was heated at 250° C for 12 hours, with a stream of nitrogen being passed through the melt from 3 hours on and 27.3 g of glycerol being added from the add vessel after a further hour 28 g of distillate were collected in the course of the condensation. The product obtained is an ocher-colored waxy solid having a drop point of 50° C. The polyester thus prepared had a molecular weight of 16,400, an acid number of 4.5 and an OH number of 4.

Example 2

Example 1 was repeated, except that the initial charge comprised 83.1 g of terephthalic acid, 1040 g of an addition product of 50 mol of ethylene oxide with 1 mol of a mixture of linear $C_{16}/C_{18}$-fatty alcohols, 1.142 g of p-toluenesulfonic acid monohydrate and 2.284 g of aqueous phosphorous acid, and 18.4 g of glycerol were added following condensation at 250° C. for 4 hours. The product obtained was a pale beige wax having a drop point of 45° C. The polyester thus prepared had a molecular weight of 12250, an acid number of 5.8 and an OH number of 11.

Example 3

Example 1 was repeated. except that the initial charge comprised 149.5 g of terephthalic acid, 840 g of the addition product of 25 mol of ethylene oxide with 1 mol of a mixture of $C_{16}/C_{18}$-fatty alcohols, 1.03 g of p-toluenesulfonic acid monohydrate and 2.06 g of 50 % strength aqueous phosphorous acid, and 36.4 g of glycerol were added following a condensation at 250° C. for 4 hours. The product obtained was a pale beige wax having a drop point of 50° C. The polyester thus prepared had a molecular weight of 22550, an acid number of 10.3 and an OH number of 2.

Example 4

Example 1 was repeated, except that the initial charge comprised 149.5 g of terephthalic acid, 1560 g of the addition product of 50 mol of ethylene oxide with 1 mol of a mixture of $C_{16}/C_{18}$-fatty alcohols, 1.74 g of p-toluenesulfonic acid monohydrate and 3.48 g of 50 % strength aqueous phosphorous acid, and 36.4 g of glycerol were added following a condensation at 250° C. for 4 hours. The product obtained was a pale brown wax having a drop point of 43° C. The polyester thus prepared had a molecular weight of 12250, an acid number of 5.8 and an OH number of 11.

Example 5

A 2-1 capacity three-neck flask equipped with an add vessel, a distillation bridge and a gas inlet means was charged with 158.1 g of dimethyl terephthalate, 700 g of the addition product of 25 mol of ethylene oxide with 1 mol of a mixture of linear $C_{16}/C_{18}$-fatty alcohols, 217 g of ethylene glycol, 0.378 g of calcium acetate, 0.096 g of antimony(III) oxide and 0.18 g of di-tert-butylmethyl phenol, and the contents were stirred and carefully purged with nitrogen. The mixture was then heated to 160° C. The methanol formed was distilled off within the range from 160° to 215° C. over 2.5 hours. In the course of 1 hour the temperature of the reaction mixture was raised to 235° C. and the pressure reduced to 1 mbar. The reaction mixture was then condensed at 235°-275° C. and at a pressure of 1 mbar for the next 2.5 hours During the condensation, 265.5 g of volatiles were distilled out of the reaction mixture The product obtained was an ocher-colored waxy solid having a drop point of 44°-51° C. The polyester thus prepared had an acid number of 0.8 and an OH number of 14.

Example 6

Example 5 was repeated, except that the initial charge comprised 126.8 g of dimethyl terephthalate, 1040 g of the addition product of 50 mol of ethylene oxide with 1 mol of a mixture of linear $C_{16}/C_{18}$-alcohols, 35.0 g of glycerol, 217 g of ethylene glycol, 0.303 g of calcium acetate and 0.077 g of antimony(III) oxide and 0.240 g of di-tert-butylmethylphenol and the mixture was condensed at 160°-250° C. for 7.5 hours, in the course of which 252.7 g of volatiles were distilled out of the reaction mixture. The product obtained was an ocher-colored waxy solid having a drop point of 52° C. The polyester had an acid number of 0.5 and an OH number of 8.

Comparative Condensate 1 as per Example 11 of U.S. Pat. No. 3,557,039

194 parts by weight of dimethyl terephthalate, 155 parts by weight of ethylene glycol and 440 parts by weight of polyethylene glycol of number average molecular weight $M_n = 1540$, 0.44 parts by weight of 2,6-di-tert-butyl-4-methylphenol, 0.1512 parts by weight of calcium acetate and 0.0388 parts by weight of antimony trioxide are heated at 190°–240° C. for 4½ hours, during which the methanol formed was removed by distillation. 0.140 part by weight of a 25 % strength solution of phosphoric acid and ethylene glycol was added, and the mixture was heated to 280°–285° C. while a rapid stream of $N_2$ was passed through the melt to drive out the ethylene glycol. After the excess ethylene glycol had been distilled off, the pressure was reduced to 0.1 torr for 15 minutes. The product was melted and the melt was stirred into water to prepare a dispersion having a 10 % solids content.

B. Application examples

The grayness-inhibiting action of the polyesters described in Examples 1 to 4 was tested as follows:

Polyester fabrics and polyester/cotton blend fabrics were subjected to a series of 3 washes together with a standard soil cloth. The soil cloth was renewed after every wash, the test fabric becoming more soiled with every wash. The whiteness of the test fabric after the 3rd wash was used to assess the degree of soiling. To increase confidence in the test results, the tests were repeated a number of times and the results averaged. Photometric measurement of the reflectance in percent was carried out in the present case on an Elrepho 2000 (Datacolor) at a wavelength of 460 nm (barium primary white standard as laid down in German Standard Specification DIN 5033). The composition of the detergent used in the tests was as follows.

| Test detergent I (liquid) | |
|---|---|
| $C_{12}/C_{14}$-alkylbenzenesulfonate | 10% |
| $C_{13}/C_{15}$-tallow fat alcohol reacted with 7 mol equivalents of ethylene oxide | 25% |
| Coconut fatty acid | 10% |
| triethanolamine | 5% |
| Polypropylene oxide of number average molecular weight $M_n$ = 600 g/mol | 2% |
| Ethanol | 5% |
| Isopropanol | 3% |
| Water | 40% |
| Test conditions: | |
| Test equipment: | Launder-O-meter |
| Water hardness: | 3.0 mmol/l (Ca:Mg = 4:1, molar ratio) |
| Liquor ratio: | 12.5:1 |
| Test temperature: | 60° C. |
| Length of wash: | 30 min |
| Detergent concentration: | 8.0 g/l |
| Soil cloth: | WFK10C (standard soil cloth from Wäscherei-forschungsanstalt Krefeld) |

Table 1 shows the increase in the reflectance of polyester fabrics and polyester/cotton blend fabrics on addition of 1 % of the polycondensates according to the present invention, based on the weight of the tested detergent used.

TABLE 1

| Example | Comparative example | Polycondensate | % Reflectance PES | % Reflectance PES/Co |
|---|---|---|---|---|
| — | 1 | none added | 52.2 | 61.7 |
| 7 | — | 1 | 66.2 | 72.8 |
| 8 | — | 2 | 65.1 | 72.7 |
| 9 | — | 3 | 60.3 | 71.0 |
| 10 | — | 4 | 60.3 | 70.4 |

| Test detergent II (powder) | |
|---|---|
| $C_{12}/C_{14}$-alkylbenzenesulfonate | 6.0% |
| $C_{13}/C_{15}$-tallow fat alcohol reacted with 7 mol equivalents of ethylene oxide | 5.0% |
| Soap | 3.0% |
| Zeolite A | 30.0% |
| Sodium metasilicate × $5H_2O$ | 5.0% |
| Sodium carbonate | 7.5% |
| Sodium sulfate | 22.4% |
| Sodium perborate × $4H_2O$ | 20.0% |
| Carboxymethylcellulose, Na salt | 0.6% |
| Test substance | 0.5% |
| Test conditions: | |
| Test equipment: | Launder-O-meter |
| Water hardness: | 3.0 mmol/l (Ca:Mg = 3:1, molar ratio) |
| Liquor ratio: | 12.5:1 |
| Test temperature: | 60° C. |
| Length of wash: | 30 min |
| Detergent concentration: | 8.0 g/l |
| Soil cloth: | WFK10D or EMPA104 (standard soil cloth from Wäscherei-forschungsanstalt Krefeld and Eidgenössische Material-Prüfungs-Anstalt, Switzerland) |

Table 2 shows the increase in the reflectance of polyester fabrics on using 0.5 % of the polycondensates according to the present invention in the test detergent. Comparative condensate 1 from U.S. Pat. No. 3,557,039, which has very good grayness-inhibiting properties, was included in the test. Whereas in the case of the WFK10D soil cloth the polycondensates according to the present invention reached approximately the same level as comparative condensate 1, the EMPA 104 soil cloth produces severe soiling in the case of the comparative product (Comparative Example 3). This adverse effect is not observed with the polymers according to the present invention.

TABLE 2

| Example | Comparative example | Poly-condensate | % Reflectance EMPA 104 | % Reflectance WFK10D |
|---|---|---|---|---|
| — | 2 | none added | 73.7 | 70.7 |
| — | 3 | comparative product | 60.2 | 78.5 |
| 11 | — | 5 | 75.2 | 77.2 |
| 12 | — | 6 | 74.0 | 77.1 |

We claim:

1. A polyester formed from a carboxylic acid which contains at least two carboxyl groups and an at least dihydric alcohol, obtained by condensation of:
   (a) an at least dicarboxylic acid, or an ester or anhydride or a mixture thereof, (b) an at least dihydric alcohol or an addition product of from 1 to 5 mol of at least one alkylene oxide of 2 or 3 carbon atoms with 1 mol of an at least dihydric alcohol, or a mixture thereof, and (c) a water-soluble addition product of from 5 to 80 mol of at least one alkylene oxide with 1 mol of a $C_8$-$C_{24}$-alcohol, a $C_8$-$C_{18}$-alkylphenol or a $C_8$-$C_{24}$-alkylamine.

in a molar ratio of (a):(b):(c) of 100:(25-2500):(5-110) at not less than 120° C. up to a weight average molecular weight of from 2000 to 50000.

2. The polyester as claimed in claim 1, wherein the condensation of (a) to (c) is carried out in the additional presence, per 100 mol parts of (a), of from 0 to 20 mol parts of (d) an alkoxylated polyhydric alcohol obtainable by addition of >5-80 mol of ethylene oxide and/or propylene oxide to a polyhydric alcohol.

3. A process for preparing a polyester as claimed in claim 1, which comprises condensing:

(a) an at least dicarboxylic acid, or an ester or anhydride or a mixture thereof, (b) an at least dihydric alcohol or an addition product of from 1 to 5 mol of at least one alkylene oxide of 2 or 3 carbon atoms with 1 mol of an at least dihydric alcohol, or a mixture thereof, and (c) a water-soluble addition product of from 5 to 80 mol of at least one alkylene oxide with 1 mol of a $C_8$-$C_{24}$-alcohol, a $C_6$-$C_{18}$-alkylphenol or a $C_8$-$C_{24}$-alkylamine and in the absence or presence of:

(d) an alkoxylated polyhydric alcohol obtainable by addition of >5-80 mol of ethylene oxide and/or propylene oxide to a polyhydric alcohol, in a molar ratio of (a):(b):(c):(d) of 100:25-2500:5110:0.20 at not less than 120° C.

4. A pulverulent and liquid detergent formulation containing as essential constituent a grayness-inhibiting and soil release-promoting addition of from 0.05 to 15 % by weight of a polyester prepared by condensation of:

(a) an at least dicarboxylic acid, or an ester or anhydride or a mixture thereof, (b) an at least dihydric alcohol or an addition product of from 1 to 5 mol of at least one alkylene oxide of 2 or 3 carbon atoms with 1 mol of an at least dihydric alcohol, or a mixture thereof, and (c) a water-soluble addition product of from 5 to 80 mol of at least one alkylene oxide with 1 mol of a $C_8$-$C_{24}$-alcohol, a $C_8$-$C_{18}$-alkylphenol or a $C_8$-$C_{24}$-alkylamine.

in a molar ratio of (a):(b):(c) of 100:(25-2500):(5-110) at not less than 120° C. up to a weight average molecular weight of from 2000 to 50000.

5. The pulverulent and liquid detergent formulation as claimed in claim 4, wherein the condensation of (a) to (c) is carried out in the additional presence, per 100 mol parts of (a), of from 0 to 20 mol parts of (d) an alkoxylated polyhydric alcohol obtainable by addition of >5-80 mol of ethylene oxide and/or propylene oxide to a polyhydric alcohol.

6. The pulverulent and liquid detergent formulation as claimed in claim 4, wherein the polyester is preparable by condensing:

(a) an at least dicarboxylic acid, or an ester or anhydride or a mixture thereof, (b) an at least dihydric alcohol or an addition product of from 1 to 5 mol of at least one alkylene oxide of 2 or 3 carbon atoms with 1 mol of an at least dihydric alcohol, or a mixture thereof, and (c) a water-soluble addition product of from 5 to 80 mol of at least one alkylene oxide with 1 mol of a $C_8$-$C_{24}$-alcohol, a $C_8$-$C_{18}$-alkylphenol or a $C_8$-$C_{24}$-alkylamine and in the absence or presence or:

(d) an alkoxylated polyhydric alcohol obtainable by addition of >5-80 mol of ethylene oxide and/or propylene oxide to a polyhydric alcohol, in a molar ratio of (a):(b):(c):(d) of 100:25-2500:5110:0.20 at not less than 120° C.

7. The polyester as claimed in claim 1, wherein said dicarboxylic acid in component (a) comprises terephthalic acid, o- and m- phthalic acid, sulfoisophthalic acid, trimellitic acid, pyromellitic acid, oxalic acid, succinic acid, glutamic acid, akipic acid, fumaric acid, maleic acid or itaconic acid.

8. The polyester as claimed in claim 1, wherein said ester in component (a) comprises dimethyl terephthalate, diethyl terephthalate, di-n-propyl terephthalate, diethyl oxalate, diethyl succinate, diethyl glutarate, monomethyl adipate, diethyl adipate, di-n-butyl adipate, monoethyl fumarate or dimethyl maleate.

9. The polyester as claimed in claim 1, wherein said anhydride in component (a) comprises maleic anhydride, succinic anhydride or phthalic anhydride.

10. The polyester as claimed in claim 1, wherein said at least dihydric alcohol in component (b) comprises ethylene glycol, 1,2-propyelene glycol, 1,3-propylene glycol, 1,4-butanediol, 2,3-butanedio, pentanediols, glycerol, pentaerythritol or aligoglycerols having a molecular weight of up to 363.

11. The polyester as claimed in claim 1, wherein said addition product in component (b) comprises i) from 1 to 5 mol of ethylene oxide or propyelen oxide or both with 1 mol of ethylene glycol, 1,2-propylene glycol, 1,3-propylene glycol, 1,4-butanediol or 2,3-butanediol; ii) from 1 to 4 mol of ethylene oxide with pentaerythritol, iii) 1 to 3 mol of ethylene oxide with 1 mol of glycerol; iv) 1 to 3 mol of propylene oxide with 1 mol of glycerol and v) 1 to 5 mol of ethylene oxide or propylene oxide or both with 1 mol of oligoglycerol containing from 2 to 5 cocondensed glycol units.

12. The polyester as claimed in claim 1, wherein said alkylene oxide of component (c) comprises ethylene oxide, propylene xoide or butylene oxide or a mixture thereof.

13. The process as claimed in claim 3, wherein said dicarboxylic acid in component (a) comprises terephthalic acid, o- and m- phthalic acid, sulfoisophthalic acid, trimellitic acid, pyromellitic acid, oxalic acid, succinic acid, glutamic acid, adipic acid, fumaric acid, maleic acid or itaconic acid.

14. The process as claimed in claim 3, wherein said ester in component (a) comprises dimethyl terephthalate, diethyl terephthalate, di-n-propyl terephthalate, diethyl oxalate, diethyl succinate, diethyl glutarate, monomethyl adipate, diethyl adipate, di-n-butyl adipate, monoethyl fumarate or dimethyl maleate.

15. The process as claimed in claim 3, wherein said anhydride in component (a) comprises maleic anhydride, succinic anhydride or phthalic anhydride.

16. The process as claimed in claim 3, wherein said at least dihydric alcohol in component (b) comprises ethylene glycol, 1,2-propylene glycol, 1,3-propylene glycol, 1,4-butanediol, 2,3-butanediol, pentanediols, glycerol, pentaerythritol or oligoglycerols having a molecular weight of up to 363.

17. The process as claimed in claim 3, wherein said addition product in component (b) comprises i) from 1 to 5 mol of ethylene oxide or propylene oxide or both with 1 mol of ethylene glycol, 1,2-propylene glycol, 1,3-propylene glycol, 1,4-butanediol or 2,3-butanediol; ii) from 1 to 4 mol of ethylene oxide with pentaerythritol; iii) from 1 to 3 mol of ethylene oxide with 1 mol of glycerol; iv) 1 to 3 mol of ethylene oxide with 1 mol of glycerol and v) 1 to 5 mol of ethylene oxide or propyelen oxide or both with 1 mol of dipoglycerol containing from 2 to 5 cocondensed glycol units.

18. The process as claimed in claim 3, wherein said alkylene oxide of component (c) comprises ethylene oxide, propylene oxide or butylene oxide or a mixture thereof.

19. The pulverulent and liquid detergent formulation as claimed in claim 4, wherein said dicarboxylic acid id component (a) comprises terephthalic acid, o- and m-phthalic acid, sulfoisophthalic acid, trimellitic acid, pyromellitic acid, oxalic acid, siccinic acid, glutamic acid, adipic acid, fumaric acid, maleic acid or itaconic acid.

20. The pulverulent and liquid detergent formulation as claimed in claim 4, wherein said ester in component (a) comprises dimethyl terephthalate, diethyl terephthalate, di-n-propyl terephthalate, diethyl oxalate, dithyl succinate, diethyl glutarate, monomethyl adipate, diethyl adipate, di-n-butyl adipate, monoethyl fumarate or dimethyl maleate.

21. The pulverulent and liquid detergent formulation as claimed in claim 4, wherein said anhydride in component (a) comprises maleic anhydride, succinic anhydride or phthalic anhydride.

22. The pulverulent and liquid detergent formulation as claimed in claim 4, wherein said at least dihydric alcohol in component (b) comprises ethylene glycol, 1,2-propylene glycol, 1,3-propylene glycol, 1,4-butanediol, 2,3-butanediol, pentanediols, glycerol, pentaerythritol or oligoglycerols having a molecular weight of up to 363.

23. The pulverulent and liquid detergent formulation as claimed in claim 4, wherein said addition product in component (b) comprises i) from 1 to 5 mol of ethylene oxide or propylene oxide or both with 1 mol of ethylene glycol, 1,2-propylene glycol, 1,3-propylene glycol, 1,4-butanediol or 2,3-butanedio; ii) from 1 to 4 mol of ethylene oxide with pentaerythritol, iii) 1 to 3 mol of ethylene oxide with 1 mol of glycerol; iv) 1 to 3 mol of propylene oxide with 1 mol of glycerol; and v) 1 to 5mol of ethylene oxide or propylene oxide or both with 1 mol of dipoglycerol containing from 2 to 5 cocondensed glycol units.

24. The pulverulent and liquid detergent formulation as claimed in claim 4, wherein said alkylene oxide of component (c) comprises ethylene oxide, propylene oxide or butylene oxide or a mixture thereof.

* * * * *